(12) United States Patent
de Diego et al.

(10) Patent No.: US 10,443,410 B2
(45) Date of Patent: Oct. 15, 2019

(54) CERAMIC MATRIX COMPOSITE (CMC) HOLLOW BLADE AND METHOD OF FORMING CMC HOLLOW BLADE

(71) Applicant: GENERAL ELECTRIC COMPANY, Schenectady, NY (US)

(72) Inventors: Peter de Diego, Saluda, NC (US); Jacob John Kittleson, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 197 days.

(21) Appl. No.: 15/624,893

(22) Filed: Jun. 16, 2017

(65) Prior Publication Data
US 2018/0363475 A1 Dec. 20, 2018

(51) Int. Cl.
| | | |
|---|---|---|
| *F01D 5/00* | (2006.01) | |
| *F01D 5/28* | (2006.01) | |
| *F01D 5/14* | (2006.01) | |
| *C04B 35/71* | (2006.01) | |
| *C04B 35/622* | (2006.01) | |

(52) U.S. Cl.
CPC ............ *F01D 5/282* (2013.01); *C04B 35/622* (2013.01); *C04B 35/71* (2013.01); *F01D 5/147* (2013.01); *F01D 5/284* (2013.01); *F05D 2230/31* (2013.01); *F05D 2240/122* (2013.01); *F05D 2240/304* (2013.01); *F05D 2300/6033* (2013.01); *F05D 2300/6034* (2013.01)

(58) Field of Classification Search
CPC .......... F01D 5/147; F01D 5/282; F01D 5/284; F05D 2240/112; F05D 2240/304; F05D 2300/31; F05D 2300/6033; F05D 2300/6034; C04B 35/71; C04B 35/622

See application file for complete search history.

(56) References Cited

U.S. PATENT DOCUMENTS

| | | | |
|---|---|---|---|
| 8,794,925 B2 | 8/2014 | McCaffrey | |
| 2004/0099391 A1* | 5/2004 | Ching | .............. D21H 19/42 |
| | | | 162/135 |
| 2005/0238491 A1* | 10/2005 | Morrison | ............... F01D 5/187 |
| | | | 416/229 R |

(Continued)

OTHER PUBLICATIONS

Extended European Search Report issued in connection with corresponding EP Application No. 18166544.9 dated Oct. 15, 2018.

*Primary Examiner* — Hieu T Vo
*Assistant Examiner* — Sherman D Manley
(74) *Attorney, Agent, or Firm* — McNees Wallace & Nurick LLC

(57) ABSTRACT

A ceramic matrix composite (CMC) hollow blade includes a CMC airfoil, which includes at least one airfoil CMC ply, at least one cavity CMC ply, and an insert. The airfoil CMC ply defines the contour of the CMC airfoil including a first edge, a second edge opposite the first edge, a first side extending from the first edge to the second edge, and a second side opposite the first side. The cavity CMC ply defines a cavity within the CMC airfoil. The insert is located between the first edge and the cavity. The insert is wrapped by a CMC ply such that the CMC ply extends along the insert from the first side of the CMC airfoil across the mean camber line of the CMC airfoil and to the second side of the CMC airfoil. The CMC ply terminates on the second side of the CMC airfoil.

20 Claims, 2 Drawing Sheets

(56) References Cited

U.S. PATENT DOCUMENTS

| | | | |
|---|---|---|---|
| 2008/0025846 A1* | 1/2008 | Vance | F01D 5/147 416/233 |
| 2008/0181766 A1* | 7/2008 | Campbell | F01D 5/14 415/116 |
| 2009/0014926 A1* | 1/2009 | Marini | C04B 35/111 264/635 |
| 2009/0165924 A1* | 7/2009 | Steibel | F01D 5/147 156/89.11 |
| 2010/0015394 A1* | 1/2010 | Morrison | B28B 1/002 428/137 |
| 2011/0206522 A1* | 8/2011 | Alvanos | F01D 5/282 416/204 R |
| 2013/0142660 A1* | 6/2013 | McCaffrey | F01D 5/147 416/241 B |
| 2014/0212292 A1 | 7/2014 | Xu | |
| 2014/0271208 A1* | 9/2014 | Garcia-Crespo | F01D 5/30 416/194 |
| 2015/0016972 A1* | 1/2015 | Freeman | F01D 5/189 415/175 |
| 2015/0377046 A1* | 12/2015 | Duelm | F01D 5/282 415/200 |
| 2016/0003072 A1* | 1/2016 | Chang | F01D 5/282 415/200 |
| 2016/0115086 A1* | 4/2016 | Tuertscher | C04B 35/573 264/29.1 |
| 2017/0122114 A1* | 5/2017 | Kittleson | B32B 18/00 |
| 2017/0268344 A1* | 9/2017 | Dasgupta | B32B 3/266 |
| 2017/0320232 A1* | 11/2017 | de Diego | C04B 35/76 |
| 2018/0230826 A1* | 8/2018 | Vetters | F01D 5/284 |

\* cited by examiner

CERAMIC MATRIX COMPOSITE (CMC) HOLLOW BLADE AND METHOD OF FORMING CMC HOLLOW BLADE

STATEMENT REGARDING FEDERALLY SPONSORED RESEARCH

This invention was made with Government support under contract number DE-FC26-05NT42643 awarded by the Department of Energy. The Government has certain rights in the invention.

FIELD OF THE INVENTION

The present embodiments are directed to ceramic matrix composite (CMC) turbine blades and methods of forming CMC turbine blades. More specifically, the present embodiments are directed to CMC hollow turbine blades including a CMC airfoil with a wrapped insert.

BACKGROUND OF THE INVENTION

The manufacture of a ceramic matrix composite (CMC) part typically includes laying up pre-impregnated composite fibers having a matrix material already present (prepreg) to form the geometry of the part (pre-form), autoclaving and burning out the pre-form, infiltrating the burned-out pre-form with the melting matrix material, and any machining or further treatments of the pre-form. Infiltrating the pre-form may include depositing the ceramic matrix out of a gas mixture, pyrolyzing a pre-ceramic polymer, chemically reacting elements, sintering, generally in the temperature range of 925 to 1650° C. (1700 to 3000° F.), or electrophoretically depositing a ceramic powder. With respect to turbine airfoils, the CMC may be located over a metal spar to form an outer covering over the metal spar or to form only the outer surface of the airfoil.

Examples of CMC materials include, but are not limited to, carbon-fiber-reinforced carbon (C/C), carbon-fiber-reinforced silicon carbide (C/SiC), silicon-carbide-fiber-reinforced silicon carbide (SiC/SiC), alumina-fiber-reinforced alumina ($Al_2O_3/Al_2O_3$), or combinations thereof. The CMC may have increased elongation, fracture toughness, thermal shock, dynamic load capability, and anisotropic properties as compared to a monolithic ceramic structure.

CMC hollow airfoils may suffer from peel stresses in the trailing edge (TE) and/or inter-laminar tensile (ILT) wishbone stresses at the TE-core interface. Due to the pressurization of the cavity within the CMC hollow airfoil during service, the leading edge (LE) and TE are subjected to high ILT ballooning stresses. Since the LE and TE cores are rounded on the interior at the cavity, a radial roll of matrix and fiber is placed to take up space where it is not possible to contain normal CMC plies.

BRIEF DESCRIPTION OF THE INVENTION

In an embodiment, a ceramic matrix composite (CMC) hollow blade includes a CMC airfoil. The CMC airfoil includes at least one airfoil CMC ply, at least one cavity CMC ply, and a first insert. The airfoil CMC ply defines a contour of a CMC airfoil including a first edge, a second edge opposite the first edge, a first side extending from the first edge to the second edge, and a second side opposite the first side. The second side extends from the first edge to the second edge. The cavity CMC ply defines a cavity within the CMC airfoil of the CMC hollow blade. The first insert is located between the first edge and the cavity. The first insert is wrapped by one of the airfoil CMC ply and the cavity CMC ply such that the one of the airfoil CMC ply and the cavity CMC ply extends along the first insert from the first side of the CMC airfoil across a mean camber line of the CMC airfoil and to the second side of the CMC airfoil. The one of the airfoil CMC ply and the cavity CMC ply terminates at a ply end on the second side of the CMC airfoil.

In another embodiment, a method of forming a ceramic matrix composite (CMC) hollow blade includes laying up at least one cavity CMC ply, placing a first insert on the at least one cavity CMC ply, and laying up at least one airfoil CMC ply around the at least one cavity CMC ply and the first insert. The cavity CMC ply defines a cavity within a CMC airfoil of the CMC hollow blade. The airfoil CMC ply defines a contour of the CMC airfoil including a first edge, a second edge opposite the first edge, a first side extending from the first edge to the second edge, and a second side opposite the first side. The second side extends from the first edge to the second edge. The first insert is located between the cavity and the first edge. The first insert is wrapped by one of the airfoil CMC ply and the cavity CMC ply such that the one of the airfoil CMC ply and the cavity CMC ply extends along the first insert from the first side of the CMC airfoil across a mean camber line of the CMC airfoil and to the second side of the CMC airfoil. The one of the airfoil CMC ply and the cavity CMC ply terminates at a ply end on the second side of the CMC airfoil.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is a ceramic matrix composite (CMC) hollow blade and a method of forming such a CMC hollow blade.

Embodiments of the present disclosure, for example, in comparison to concepts failing to include one or more of the features disclosed herein, achieve a better tying of CMC plies, provide a stronger encapsulated insert, provide a more robust CMC airfoil system, reduce the likelihood of inter-laminar crack growth in the trailing edge, target ply terminations away from the mean camber line, provide a stronger encapsulated insert, enable a more ideal ply construction, reduce fallout of parts, decrease cost, or combinations thereof.

A cavity, as used herein, refers to any intentionally-formed void space located in the CMC airfoil of a CMC hollow blade and having a predetermined contour defined by a mandrel and/or one or more cavity CMC plies.

An insert, as used herein, refers to any permanent structure having a non-ply contour that is placed with respect to CMC ply layers to aid in the transition of the CMC ply layers from the contour of the cavity to the contour of the outer surface of the CMC airfoil.

A cavity CMC ply, as used herein, refers to any CMC ply that is located closer to the cavity than the outer surface of a CMC airfoil or that more closely follows the contour of the cavity of the CMC airfoil than the contour of the outer surface of the CMC airfoil.

An airfoil CMC ply, as used herein, refers to any CMC ply that is located closer to the outer surface than the cavity of a CMC airfoil or that more closely follows the contour of the outer surface of the CMC airfoil than the contour of the cavity of the CMC airfoil.

A mean camber line, as used herein, refers to the centerline of an airfoil between the pressure side and the suction side of the airfoil.

Figure 1:
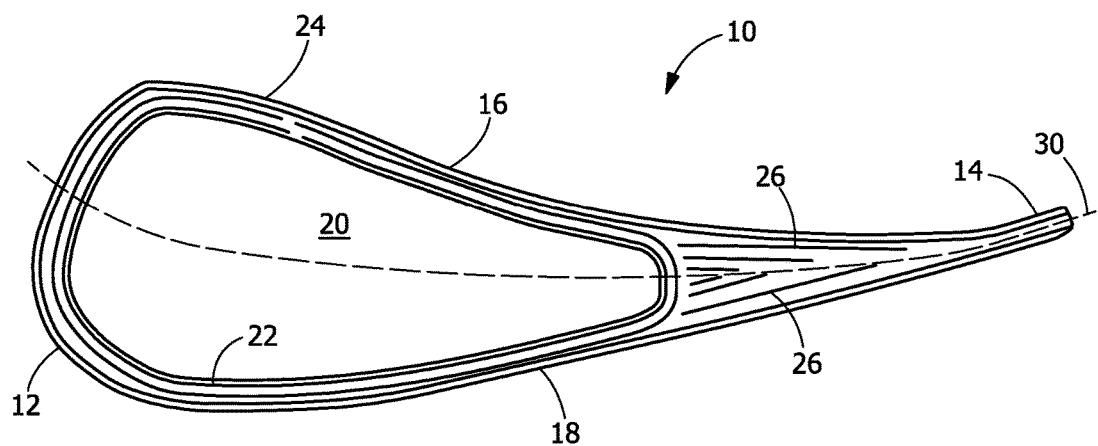
FIG. 1 is a cross sectional view of a CMC airfoil of a ceramic matrix composite (CMC) hollow blade.

Referring to FIG. 1, the CMC airfoil 10 of a CMC hollow blade includes a leading edge (LE) 12, a trailing edge (TE) 14, a pressure side (PS) 16, a suction side (SS) 18, and a cavity 20. At least one cavity CMC ply 22 defines the cavity 20 and at least one airfoil CMC ply 24 defines the contour of the CMC airfoil 10, including the LE 12, the TE 14, the PS 16, and the SS 18. Internal CMC plies 26 fill the space between the cavity 20 and the TE 14. At least one end of the airfoil CMC plies 24 and the internal CMC plies 26 terminates at the mean camber line 30 of the CMC airfoil 10. For clarity and simplicity, the cavity CMC plies 22, airfoil CMC plies 24, and internal CMC plies 26 are shown schematically in FIG. 1 and FIG. 2 as lines and additional cavity CMC plies 22, airfoil CMC plies 24, and internal CMC plies 26 may be present in a CMC airfoil 10.

Figure 2:
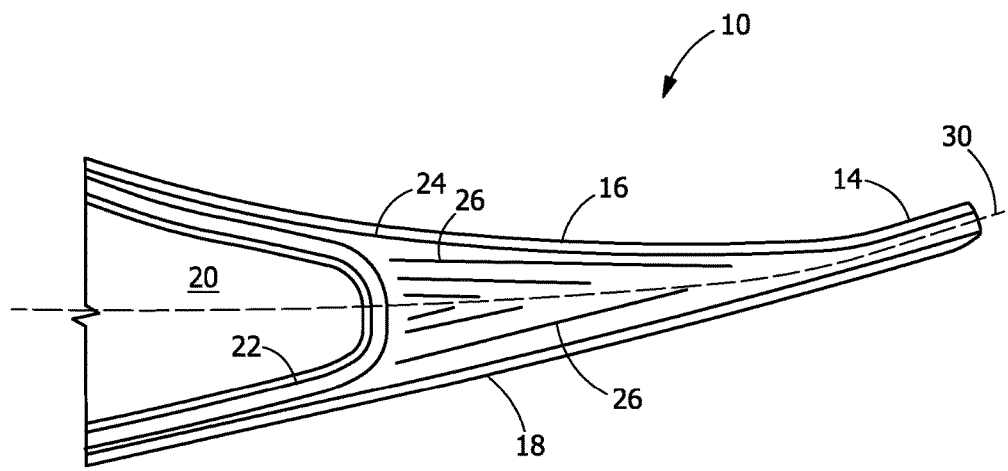
FIG. 2 is a cross sectional view of the trailing edge portion of the CMC airfoil of FIG. 1 showing the internal CMC plies.

As is more clearly visible in FIG. 2, the internal CMC plies 26 have varying lengths to run substantially parallel to each other while filling the space between the cavity CMC plies 22 and the airfoil CMC plies 24. As noted above, CMC hollow blades may suffer from peel stresses in the TE 14, due to pressurizing of the cavity 20 during service causing high inter-laminar tensile (ILT) ballooning stresses. This peel stress tends to be strongest along the mean camber line 30 of the CMC airfoil 10.

Figure 3:
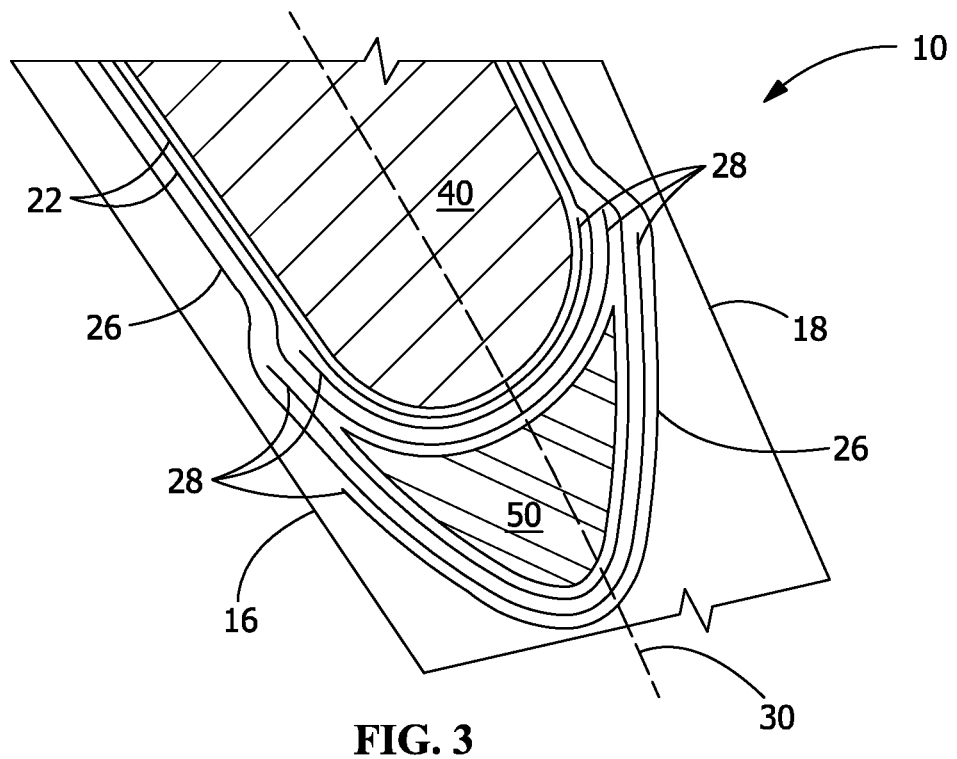
FIG. 3 is a cross sectional view of a portion of a CMC airfoil of a CMC hollow blade with internal CMC plies laid up off the mean camber line and overlapping in an embodiment of the present disclosure.
Figure 4:
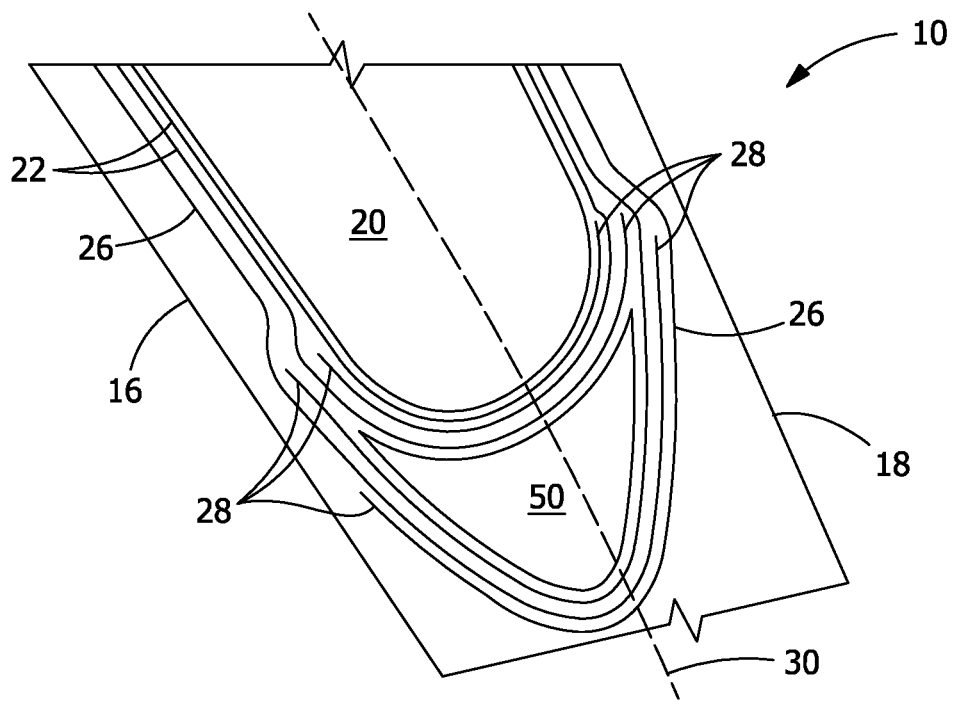
FIG. 4 is a cross sectional view of the portion of the CMC airfoil of FIG. 3 with the mandrel removed.

Referring to FIG. 3 and FIG. 4, a first cavity CMC ply 22 is laid up to extend along and around a mandrel 40 to define the cavity 20 of the CMC airfoil 10. The mandrel 40 is ultimately removed to form the cavity 20 in the CMC airfoil 10 having the contour of the mandrel 40. The first cavity CMC ply 22 starts with a first ply end 28 contacting the mandrel 40 on the SS 18 of the CMC airfoil 10. The first cavity CMC ply 22 then extends along the mandrel 40 across the mean camber line 30 on the TE end of the mandrel 40 toward the PS 16 of the CMC airfoil 10, wraps the mandrel 40 and overlaps itself, extends across the mean camber line 30 again, and terminates at a second ply end 28 on the PS 16 of the CMC airfoil 10, as shown in FIG. 3 and FIG. 4. For clarity and simplicity, only cavity CMC plies 22 are shown in FIG. 3 and FIG. 4 and the cavity CMC plies 22 are only shown schematically as lines. Airfoil CMC plies 24 and internal CMC plies 26 (see FIG. 1 and FIG. 2) and additional cavity CMC plies 22 may be present in a CMC airfoil 10.

Alternatively, the first cavity CMC ply 22 may start with the first ply end 28 contacting the mandrel 40 on the PS 16 of the CMC airfoil 10. The first cavity CMC ply 22 then extends along the mandrel 40 across the mean camber line 30 on the TE end of the mandrel 40 toward the SS 18 of the CMC airfoil 10, wraps the mandrel 40 and overlaps itself, extends across the mean camber line 30 again, and terminates at a second ply end 28 on the SS 18 of the CMC airfoil 10.

Referring to FIG. 3 and FIG. 4, a second cavity CMC ply 22 is laid up starting with a first ply end 28 contacting the first cavity CMC ply 22 on the SS 18 of the CMC airfoil 10. The second cavity CMC ply 22 then extends along the first cavity CMC ply 22 across the mean camber line 30 on the TE end of the mandrel 40 toward the PS 16 of the CMC airfoil 10. An insert 50 is placed on the second cavity CMC ply 22 on the TE side of the mandrel 40. The second cavity CMC ply 22 then wraps the first cavity CMC ply 22, extends along the insert 50 across the mean camber line 30 again, and terminates at a second ply end 28 on the PS 16 of the CMC airfoil 10, preferably wrapping the insert 50, as shown in FIG. 3 and FIG. 4.

Alternatively, the second cavity CMC ply 22 may start with a first ply end 28 contacting the first cavity CMC ply 22 on the PS 16 of the CMC airfoil 10. The second cavity CMC ply 22 then extends along the first cavity CMC ply 22 across the mean camber line 30 on the TE end of the mandrel 40 toward the SS 18 of the CMC airfoil 10. An insert 50 is then placed on the second cavity CMC ply 22 on the TE side of the mandrel 40. The second cavity CMC ply 22 then wraps the first cavity CMC ply 22, extends along the insert 50 across the mean camber line 30 again, and terminates at a second ply end 28 on the SS 18 of the CMC airfoil 10, preferably wrapping the insert 50.

The cavity CMC ply 22 that wraps the insert 50 crosses the mean camber line 30 at least twice: once on the cavity-facing edge of the insert 50 and once on the TE-facing edge of the insert 50. In some embodiments, the cavity CMC ply 22 or an airfoil CMC ply 24 wrapping the insert 50 may extend more than two times across the mean camber line 30.

Although FIG. 3 and FIG. 4 show the same cavity CMC ply 22 contacting both the cavity-facing edge of the insert 50 and the TE-facing edge of the insert 50, different CMC plies may contact the cavity-facing edge and the TE-facing edge of the insert 50. For example, a cavity CMC ply 22 may instead contact the cavity-facing edge of the insert 50, while a different neighboring CMC ply, such as a cavity CMC ply 22 or an airfoil CMC ply 24, contacts the TE-facing edge of the insert 50.

Still referring to FIG. 3 and FIG. 4, an internal CMC ply 26 is laid up starting with a first ply end 28 contacting the second cavity CMC ply 22 on the SS 18 of the CMC airfoil 10. The internal CMC ply 26 then extends along the second cavity CMC ply 22 across the mean camber line 30 on the TE end of the mandrel 40 and insert 50 and further extends toward the PS 16 of the CMC airfoil 10. The internal CMC ply 26 then wraps the second cavity CMC ply 22, extends across the mean camber line 30 again, and terminates at a second ply end 28 on the PS 16 of the CMC airfoil 10, as shown in FIG. 3 and FIG. 4.

Alternatively, the internal CMC ply 26 may start with a first ply end 28 contacting the second cavity CMC ply 22 on the PS 16 of the CMC airfoil 10. The internal CMC ply 26 then extends along the second cavity CMC ply 22 across the mean camber line 30 on the TE end of the mandrel 40 and insert 50 toward the SS 18 of the CMC airfoil 10. The internal CMC ply 26 then wraps the second cavity CMC ply 22, extends across the mean camber line 30 again, and terminates at a second ply end 28 on the SS 18 of the CMC airfoil 10.

Similar to the insert 50 between the cavity 20 and the TE 14 shown in FIG. 3 and FIG. 4, an insert 50 may alternatively or additionally be located between the cavity 20 and the LE 12 of the CMC airfoil 10. In one embodiment, additional inserts are not present between the cavity 20 and the LE 12 of the CMC airfoil 10. The arrangement, according to the present disclosure, may create larger cavity fillets that can be located closer to the TE 14 than known designs that may have a smaller arrangement.

The ply ends 28 of the cavity CMC plies 22 overlapping and being located off of the mean camber line 30 reduces the likelihood of interlaminar crack growth in the TE 14 of the CMC airfoil 10. The ply ends 28 may be located to extend to any predetermined location past the mean camber line 30 that reduces the likelihood of such interlaminar crack growth.

The insert 50 may be made of any material compatible with the cavity CMC plies 22, airfoil CMC plies 24, and/or internal CMC plies 26 that flank or contact the insert 50. In some embodiments, the insert 50 is a radial roll. In some embodiments, the insert 50 includes a matrix and a fiber material. In some embodiments, the insert 50 includes a fiber material. In some embodiments, the insert 50 is fully infiltrated at the time of insertion. In some embodiments, the insert 50 includes a ply of ceramic-containing material continuously rolled onto itself to form a cylinder or other shape of ceramic-containing material ("jelly roll"). In some embodiments, the insert 50 does not include any plies. In some embodiments, the insert 50 does not include any infiltratable medium or solid. In some embodiments, the volume corresponding to the location of the insert 50 is void or substantially void of material after CMC densification.

In some embodiments, the insert 50 fills a space that would otherwise be too small for an insert 50 or where the insert 50 would otherwise cause too sharp of a transition for CMC plies without the overlapping of ply ends 28, as described herein.

In some embodiments, none of the ply ends 28 of the cavity CMC plies 22 and internal CMC plies 26 are located on or near the mean camber line 30 of the CMC airfoil 10. In some embodiments, only the ply ends 28 of the outermost airfoil CMC ply 24 are located on or near the mean camber line 30 of the CMC airfoil 10. In some embodiments, all of the ply ends 28 of the cavity CMC plies 22 and internal CMC plies 26 are located at least a predetermined distance away from the mean camber line 30 of the CMC airfoil 10.

In some embodiments, larger power CMC parts permit TE core wraps. As shown in FIG. 3 and FIG. 4, the ply terminations are preferably targeted to be away from the mean camber line 30. Larger power parts enable a more ideal ply construction.

The chance of interlaminar crack growth in the TE 14 may be reduced by filling the void between the cavity 20 and the TE 14 with a higher strength insert 50 that extends in the radial direction. The insert 50 is contained by overlapping fiber CMC plies. In some embodiments, the LE 12 and TE 14 ply end 28 terminations are of most importance. In some embodiments, high ILT strength structures are overlapped and contained within these areas.

By wrapping the inserts 50, which may be placed within the LE 12 and/or the TE 14 of a hollow CMC airfoil 10 with CMC plies that return from the PS 16 to the SS 18, or vice versa, a better tying of plies may be achieved. Containment CMC plies wrap from the PS 16 to the SS 18, or vice versa, around the insert 50, where the ILT is at its maximum.

In some embodiments, the methods described herein are compatible with current fabrication techniques and aid in the formation of a CMC core.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A ceramic matrix composite (CMC) hollow blade comprising a CMC airfoil comprising:
    at least one airfoil CMC ply defining a contour of the CMC airfoil including a first edge, a second edge opposite the first edge, a first side extending from the first edge to the second edge, and a second side opposite the first side, the second side extending from the first edge to the second edge;
    at least one cavity CMC ply defining a cavity within the CMC airfoil of the CMC hollow blade; and
    a first insert located between the first edge and the cavity, the first insert being wrapped by one of the at least one airfoil CMC ply and the at least one cavity CMC ply such that the one of the at least one airfoil CMC ply and the at least one cavity CMC ply, starting off a mean camber line of the CMC airfoil, extends along the first insert from the first side of the CMC airfoil across the mean camber line and to the second side of the CMC airfoil, the one of the at least one airfoil CMC ply and the at least one cavity CMC ply terminating at a ply end on the second side of the CMC airfoil off the mean camber line.

2. The CMC hollow blade of claim 1, wherein the first side is a pressure side and the second side is a suction side.

3. The CMC hollow blade of claim 1, wherein the first side is a suction side and the second side is a pressure side.

4. The CMC hollow blade of claim 1, wherein the first edge is a leading edge and the second edge is a trailing edge.

5. The CMC hollow blade of claim 1, wherein the first edge is a trailing edge and the second edge is a leading edge.

6. The CMC hollow blade of claim 1 further comprising a second insert between the second edge and the cavity.

7. The CMC hollow blade of claim 6, wherein the second insert is wrapped by another of the at least one airfoil CMC ply and the at least one cavity CMC ply extending along the second insert from the first side of the CMC airfoil across a mean camber line of the CMC airfoil and to the second side of the CMC airfoil.

8. The CMC hollow blade of claim 1, wherein the one of the at least one airfoil CMC ply and the at least one cavity CMC ply crosses the mean camber line between the first edge and the cavity at least twice.

9. The CMC hollow blade of claim 1, wherein the one of the at least one airfoil CMC ply and the at least one cavity CMC ply is one of the at least one cavity CMC ply.

10. A method of forming a ceramic matrix composite (CMC) hollow blade, the method comprising:

laying up at least one cavity CMC ply defining a cavity within a CMC airfoil of the CMC hollow blade;

placing a first insert on the at least one cavity CMC ply; and laying up at least one airfoil CMC ply around the at least one cavity CMC ply and the first insert, the at least one airfoil CMC ply defining a contour of the CMC airfoil including a first edge, a second edge opposite the first edge, a first side extending from the first edge to the second edge, and a second side opposite the first side, the second side extending from the first edge to the second edge;

wherein the first insert is located between the cavity and the first edge; and wherein the first insert is wrapped by one of the at least one airfoil CMC ply and the at least one cavity CMC ply such that the one of the at least one airfoil CMC ply and the at least one cavity CMC ply, starting off a mean camber line of the CMC airfoil, extends along the first insert from the first side of the CMC airfoil across the mean camber line and to the second side of the CMC airfoil, the one of the at least one airfoil CMC ply and the at least one cavity CMC ply terminating at a ply end on the second side of the CMC airfoil off the mean camber line.

11. The method of claim 10, wherein the first side is a pressure side and the second side is a suction side.

12. The method of claim 10, wherein the first side is a suction side and the second side is a pressure side.

13. The method of claim 10, wherein the first edge is a leading edge and the second edge is a trailing edge.

14. The method of claim 10, wherein the first edge is a trailing edge and the second edge is a leading edge.

15. The method of claim 10 further comprising placing a second insert between the second edge and the cavity.

16. The method of claim 15 further comprising wrapping the second insert by another of the at least one airfoil CMC ply and the at least one cavity CMC ply extending along the second insert from the first side of the CMC airfoil across a mean camber line of the CMC airfoil and to the second side of the CMC airfoil.

17. The method of claim 10, wherein the one of the at least one airfoil CMC ply and the at least one cavity CMC ply crosses the mean camber line between the first edge and the cavity at least twice.

18. The method of claim 10, wherein the one of the at least one airfoil CMC ply and the at least one cavity CMC ply is one of the at least one cavity CMC ply.

19. The method of claim 18, wherein the one of the at least one airfoil CMC ply and the at least one cavity CMC ply extends across the mean camber line more than twice.

20. The CMC hollow blade of claim 9, wherein the one of the at least one airfoil CMC ply and the at least one cavity CMC ply extends across the mean camber line more than twice.

* * * * *